US008827561B2

(12) United States Patent
Lagerweij et al.

(10) Patent No.: US 8,827,561 B2
(45) Date of Patent: Sep. 9, 2014

(54) MAIN BEARING FOR A WIND TURBINE

(75) Inventors: Hendrik Lambertus Lagerweij, Kootwijkerbroek (NL); Albertus Waaijenberg, Barneveld (NL); Aart van de Pol, Otterlo (NL); André Pubanz, Amersfoort (NL)

(73) Assignee: Lagerwey Wind B.V., Barneveld (NL)

( * ) Notice: Subject to any disclaimer, the term of this patent is extended or adjusted under 35 U.S.C. 154(b) by 46 days.

(21) Appl. No.: 13/514,607

(22) PCT Filed: Dec. 8, 2010

(86) PCT No.: PCT/NL2010/050830
§ 371 (c)(1),
(2), (4) Date: Aug. 27, 2012

(87) PCT Pub. No.: WO2011/071378
PCT Pub. Date: Jun. 16, 2011

(65) Prior Publication Data
US 2013/0049372 A1     Feb. 28, 2013

(30) Foreign Application Priority Data
Dec. 8, 2009   (NL) ..................................... 2003925

(51) Int. Cl.
*F16C 33/58*   (2006.01)
(52) U.S. Cl.
USPC ............................................ 384/126; 290/55
(58) Field of Classification Search
CPC ..................................................... F16C 33/58
USPC .......................................................... 290/55
See application file for complete search history.

(56) References Cited

U.S. PATENT DOCUMENTS

| 4,083,613 | A  | * | 4/1978  | McGee ......................... 384/585 |
| 7,084,522 | B2 |   | 8/2006  | Wobben |
| 7,205,678 | B2 | * | 4/2007  | Casazza et al. ................. 290/55 |
| 7,377,750 | B1 |   | 5/2008  | Costin et al. |
| 7,431,567 | B1 | * | 10/2008 | Bevington et al. ........ 416/244 R |

(Continued)

FOREIGN PATENT DOCUMENTS

| DE | 44 02 184 A1 | 8/1995 |
| EP | 1 426 639 A1 | 6/2004 |

(Continued)

OTHER PUBLICATIONS

International Search Report, dated Sep. 2, 2011, from corresponding PCT application.

*Primary Examiner* — Joseph Waks
(74) *Attorney, Agent, or Firm* — Young & Thompson

(57) ABSTRACT

A wind turbine includes a tower (8), a nacelle (3) being connected to the tower (8), and a rotor (2) having a rotor hub (6) and a number of rotor blades (7) extending radially outwards from the rotor hub (6). The nacelle (3) includes a hollow shaft (10) and the rotor hub (6) includes a support member (11) which is connected to the hollow shaft (10) by two tapered roller bearings (14, 15) so as to be rotatable about an axis of rotation (5). The tapered roller bearings (14, 15) each have a bearing width (w) which is defined in a direction parallel to the axis of rotation (5). The tapered roller bearings (14, 15) are arranged at a distance (d) from one another which is not greater than the bearing width (w) of the tapered roller bearings (14, 15).

14 Claims, 3 Drawing Sheets

(56) References Cited

U.S. PATENT DOCUMENTS

| | | | |
|---|---|---|---|
| 7,891,941 B2 * | 2/2011 | Bevington et al. | 415/123 |
| 8,003,582 B2 * | 8/2011 | Mikami | 508/165 |
| 8,075,196 B2 * | 12/2011 | Burner et al. | 384/558 |
| 8,308,430 B2 * | 11/2012 | Bevington et al. | 415/177 |
| 8,384,233 B2 * | 2/2013 | Lagerweij et al. | 290/55 |
| 2005/0232528 A1 * | 10/2005 | Gobel et al. | 384/571 |
| 2008/0219606 A1 * | 9/2008 | Sada et al. | 384/286 |
| 2010/0308594 A1 * | 12/2010 | Numajiri | 290/55 |
| 2011/0001320 A1 * | 1/2011 | Lagerweij et al. | 290/55 |

FOREIGN PATENT DOCUMENTS

| | | | | |
|---|---|---|---|---|
| EP | 2143944 A1 | * | 1/2010 | F03D 11/00 |
| JP | 2009287658 A | * | 12/2009 | |
| WO | 2006/000214 A1 | | 1/2006 | |

* cited by examiner

MAIN BEARING FOR A WIND TURBINE

The invention relates to a wind turbine, comprising a tower, a nacelle being connected to the tower, and a rotor having a rotor hub and a number of rotor blades extending radially outwards from the rotor hub.

U.S. Pat. No. 7,084,522 discloses a wind power installation which is provided with a tower and a housing connected to the top of the tower. Fixed to the front end of the housing is a central ring. The wind power installation has a rotor which comprises a hub and rotor blades. The hub is mounted to a hollow shaft, which encloses the outer race of a inclined roller bearing having two rows of rollers which are inclined at an angle of 45° relative to the axis of rotation. The inner race of the bearing is formed by rings which each support a respective row of rollers and which are held by an annular collar of a hollow axis tube member which in turn is mounted to the central ring and thereby fixed to the housing.

Thus, the hollow shaft is supported on the hollow axis tube member by only a single bearing which also carries moments. When in use, the rotor blades of the wind power installation are subjected to flap loads directed substantially parallel to the axis of rotation. The flap forces result in bending moments in the rotor blades, which increase from the tip to the root. The bending moments at the location where the root is connected to the hub are significant. In order to withstand all moments the diameter of the single bearing and the diameter of the hollow shaft have to be relatively large. In addition, the single bearing cannot be standard, but has to be custom-made, which leads to relatively high costs.

An object of the invention is to provide a wind turbine having a bearing arrangement which is able to withstand relatively high bending moments and which is cost-effective at the same time.

According to the invention this object is achieved by a wind turbine in accordance with claim 1.

According to the invention, the rotor hub is connected to the hollow shaft by two tapered roller bearings which are arranged at a distance from each other which is equal to or smaller than the bearing width of each bearing, i.e. the distance between the tapered roller bearings is relatively small. The tapered roller bearings are situated close to each other such that both bearings carry a part of the total weight of the rotor. The total weight of the rotor is distributed over the two proximate tapered roller bearings. At the same time, the distance between the tapered roller bearings is sufficiently large to withstand the bending moments exerted by the rotor blades. Thus, the distance between the tapered roller bearings is optimized such that together they are able to carry both the weight of the rotor and the bending moments. In addition, as a result of the relatively small distance between the tapered roller bearings, the loads which have to be carried by the bearings are decreased to such an extent that standard tapered roller bearings can be used. This reduces the costs of the bearing arrangement.

It is noted that DE4402184 discloses a wind turbine having a bearing arrangement for supporting rotation of the rotor and which serves for receiving external forces and moments. The bearing arrangement is provided with two tapered roller bearings which are mounted at a relatively large distance from each other. As a result, the first tapered roller bearing which is situated close to the rotor hub is subjected to a high load resulting from the weight of the rotor. The weight of the rotor is hardly carried by the second tapered roller bearing which is situated remote from the rotor hub. Consequently, the first bearing is relatively heavy and expensive.

It is noted that wind turbine having a solid shaft for connecting the rotor is generally known. The solid shaft is supported by two bearings which are mounted at a large distance from each other. The first bearing closest to the rotor hub is designed for carrying the weight of the rotor, whereas the second bearing remote from the rotor hub is designed as a thrust bearing. A solid shaft is relatively heavy and expensive. In addition, a solid shaft impedes access to the interior of the rotor hub and rotor blades, whereas the hollow shaft according to the invention improves the accessibility to the interior of the rotor hub and rotor blades. This can be advantageous for maintenance, for example when there is a pitch adjustment mechanism for the rotor blades.

In an embodiment said distance between the tapered roller bearings is not greater than half of the bearing width of the tapered roller bearings. In an even further embodiment, the distance between the tapered roller bearings is not greater than one tenth of the bearing width of the tapered roller bearings. As a result, even when the two tapered roller bearings are constructed as standard tapered roller bearings with relatively simple design and low weight, they can together withstand both the weight of the rotor and the bending moments resulting from the flap loads on the rotor blades.

The distance between the tapered roller bearings depends on the dimensions of the wind turbine. For example, the bearing width of each tapered roller bearing is 185 mm and the distance between the tapered roller bearings is not greater than 185 mm.

The tapered roller bearings may each have a bearing outer diameter $r_o$ which is 1.0-2.5 meter. The bearing inner diameter $r_i$ may be chosen in the range of 0.6-2.0 meter. While maintaining the bearing diameter relatively small, the two tapered roller bearings are able to carry the loads exerted by the weight of the rotor and the bending moments of the rotor blades, because they are situated at a relatively small distance from each other.

In an embodiment, the inner diameter of the hollow shaft is 0.5-1.8 meter. Because the two tapered roller bearings are mounted at a relatively small distance from each other according to the invention, the moments exerted on the bearings are reduced and consequently the hollow shaft can be relatively small, such as smaller than 1.8 meter. In addition, a hollow shaft having an inner diameter of 0.5 meter or more is advantageous for maintenance of the interior of the rotor hub and rotor blades, because a serviceman can have access to it through the hollow shaft.

In an embodiment, the support member of the rotor hub is connected to the hollow shaft by said two tapered roller bearings only. In this case, the connection between the hollow shaft and the support member of the rotor hub is formed exclusively by the two tapered roller bearings. Without the use of other bearings, the two tapered roller bearings are able to provide rotational support for the rotor of the wind turbine. This allows a simple construction having a long life.

In an embodiment, each tapered roller bearing comprises an outer ring, an inner ring and a roller assembly having conical rollers, and in which the support member of the rotor hub is fixed to the outer ring, and in which the hollow shaft is fixed to the inner ring. During use, the inner ring remains stationary, whereas the outer ring rotates with respect to the inner ring.

At least parts of the outer ring and/or the inner ring of each tapered roller bearing may be hardened, e.g. by using carbonized steel for the outer ring and/or inner ring. In a further embodiment, only the raceway of the outer ring and/or inner ring are hardened, e.g. using annealing of the raceway parts of the roller bearing. As an alternative, the outer ring and/or inner ring of each tapered roller bearing may be hardened by temperature treatment, e.g. using induction heating. As a result, it is possible to bore holes in the relatively softer parts of the outer ring and/or inner ring, allowing easy machining for construction purposes.

In order to mount the two tapered roller bearing at the desired distance with respect to each other, it is possible that a spacer is arranged between the tapered roller bearings. The tapered roller bearings are arranged against the spacer on either side of it, viewed in the direction parallel to the axis of rotation. The spacer forms a stop for the tapered roller bearings.

In an embodiment, the wind turbine comprises an electrical generator having a static part and a rotating part, and in which the rotating part of the electrical generator is fixed to the support member of the rotor hub. The rotating part of the electrical generator may be situated radially outward with respect to the tapered roller bearings.

In an even further embodiment, the wind turbine further comprises a pre-stress ring mounted in contact with the tapered roller bearings. This allows to operate the roller bearings under pre-stress conditions, which when properly chosen will enlarge the operational life of the tapered roller bearings.

Two sealing rings may be provided in a further embodiment, which seal off a bearing space between the hollow shaft and the support member. As the tapered roller bearings are positioned rather close together in the present invention embodiments, the sealing rings may be easily positioned, and lubrication of the tapered roller bearings can be accomplished with simple means.

The invention will now be explained in more detail below merely by way of example with reference to the attached drawing, in which.

Figure 1:
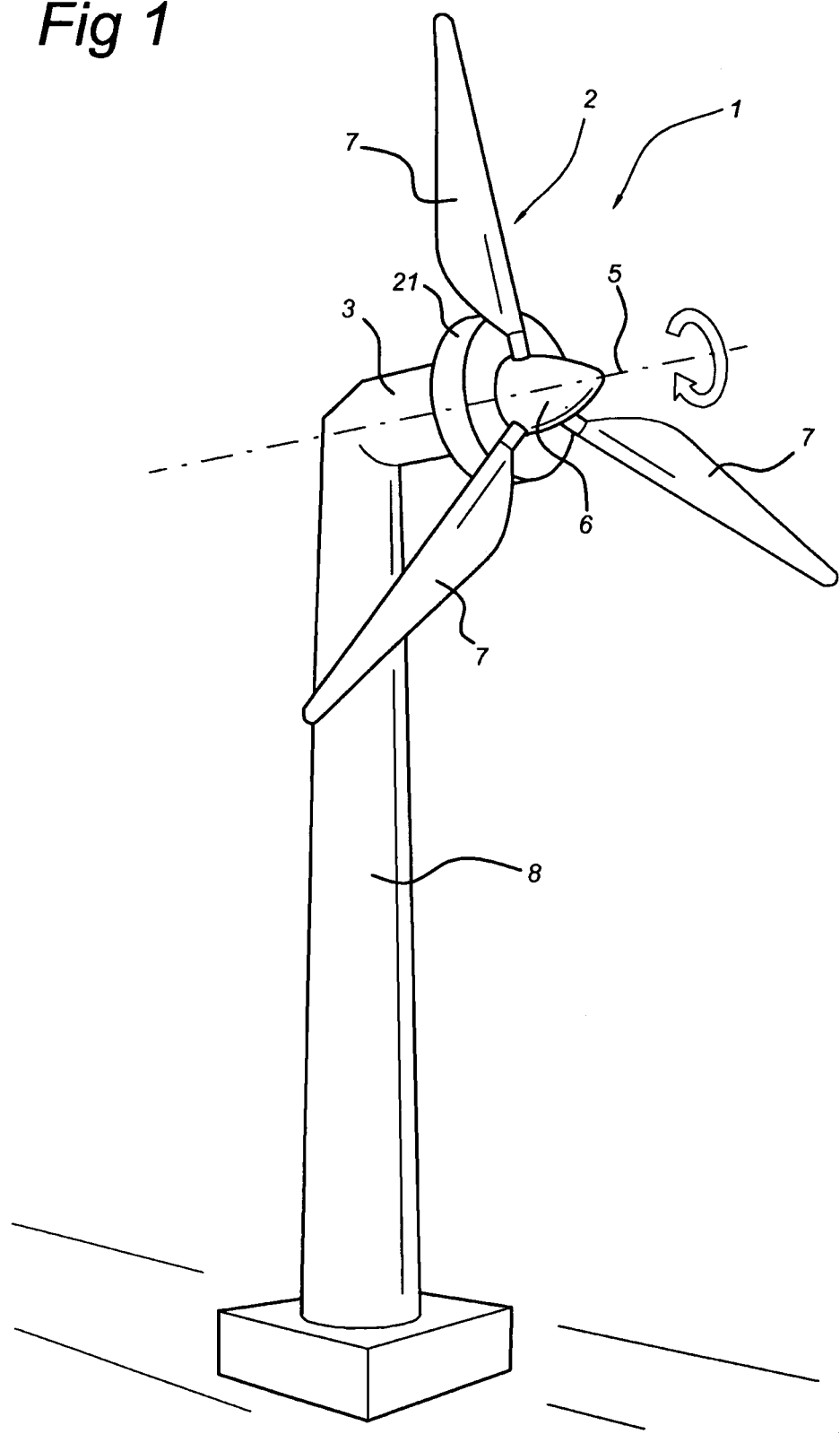
FIG. 1 shows a perspective view of a wind turbine according to the invention.

The wind turbine illustrated in FIG. 1 is denoted overall by reference numeral 1. In this exemplary embodiment, the wind turbine 1 is built on land, but the wind turbine 1 may also be built at sea (offshore). The wind turbine 1 comprises a tower 8 and a nacelle 3 being connected to the top of the tower 8. The wind turbine 1 is provided with a rotor 2, which is connected to the nacelle 3 so as to be rotatable about an axis of rotation 5. The rotor 2 comprises a rotor hub 6 and a number of rotor blades 7. Although in this exemplary embodiment the rotor 2 has three rotor blades, more or fewer rotor blades may be provided. The rotor blades 7 extend radially outwards from a root end at the rotor hub 6 to a tip end.

Figure 2:
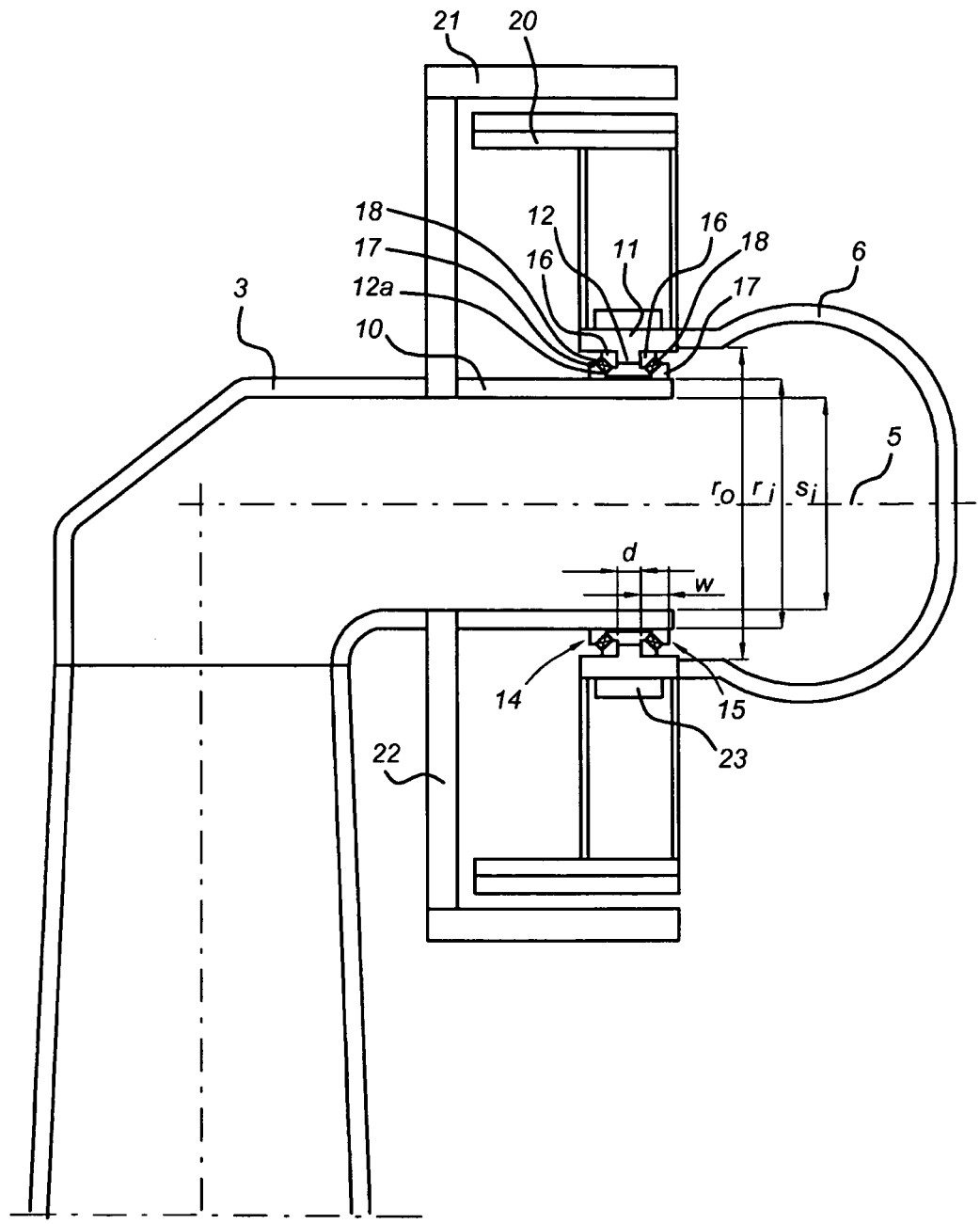
FIG. 2 shows a cross-sectional view according to II-II in FIG. 1 of an embodiment of the present invention.

As shown in FIG. 2, the nacelle 3 is provided with a hollow shaft 10. The hollow shaft 10 has a inner diameter of, for example, 0.8 meter. The rotor hub 6 comprises a support member 11. In this exemplary embodiment, the support member 11 comprises a tube member which is attached to the rotor hub 6. The tube member 11 is connected to the hollow shaft 10 by two tapered roller bearings 14, 15 so as to be rotatable about the axis of rotation 5. As a result of the tapered roller bearings 14, 15, the rotor 2 can be rotated with respect to the nacelle 3. Apart from the tapered roller bearings 14, 15 there is no other connection between the hollow shaft 10 and the tube member 11. On its side facing away from the tapered roller bearings 14, 15 the tube member 11 is attached to a rotating part 20 of an electrical generator. The electrical generator also comprises a static part 21, which is fixedly connected to the nacelle 3, e.g. using a closing plate 22 as indicated in FIG. 2.

In this exemplary embodiment, the two tapered roller bearings 14, 15 are identical. The tapered roller bearings 14, 15 each comprise an outer ring 16, an inner ring 17, and a roller assembly 18 having conical rollers. The outer ring 16 of the tapered roller bearings is fixed to the tube member 11 of the rotor hub 6, whereas the inner ring 17 is attached to the hollow shaft 10. The outer ring 16 and/or the inner ring 17 may be provided with a hardened raceway (e.g. using temperature treatment by induction heating), or can be made of hardened steel (e.g. carbonized steel). Having an outer ring 16 and/or inner ring 17 which comprise hardening only in a functional area such as the raceway facilitates simple connections to the tube member 11 and hollow shaft 10, as constructive operations such as machining can be more easily performed on the softer parts of the outer ring 16 and/or inner ring 17.

The tapered roller bearings 14, 15 each have a width w defined in a direction parallel to the axis of rotation 5. The tube member 11 is provided with an annular collar 12, which forms a spacer between the two tapered roller bearings 14, 15. The annular collar 12 has two shoulders on either side, and the two tapered roller bearings 14, 15 are mounted against the shoulders of the annular collar 12, respectively. Additionally or as an alternative, a spacer 12a is positioned on the outer side of hollow shaft 10. Similarly, the inner rings 17 of the tapered bearings 14, 15 are mounted against shoulders of the spacer 12a.

Thus, the tapered roller bearings 14, 15 are positioned at a relatively small distance d from each other. In this exemplary embodiment, the distance d is less than half of the width w of the tapered roller bearings 14, 15. For example, the width w of the tapered roller bearings 14, 15 is 185 mm, whereas the distance d between the tapered roller bearings 14, 15 is 80 mm.

As a result of the relatively small distance between the tapered roller bearings 14, 15, they co-operate together to withstand the weight of the rotor 2 and also the bending moments exerted by the rotor blades 7, and the tapered roller bearings 14, 15 can be formed by standard tapered roller bearings which are inexpensive and easily available.

In a further embodiment a pre-stress ring 23 (or closing ring) is mounted in mechanical contact with the tapered roller bearings 14, 15. In the embodiment shown in FIG. 2, a pre-stress ring 23 in the shape of a tensioning band is provided on the outer surface of the support member 11, in order to provide a tensioning force on the tapered roller bearings 14, 15. Alternatively, the pre-stress ring 23 may be mounted on the inside of the hollow shaft 10, and set to apply a force to the outer side of the hollow body 10 in order to pre-stress the tapered bearings 14, 15.

Figure 3:
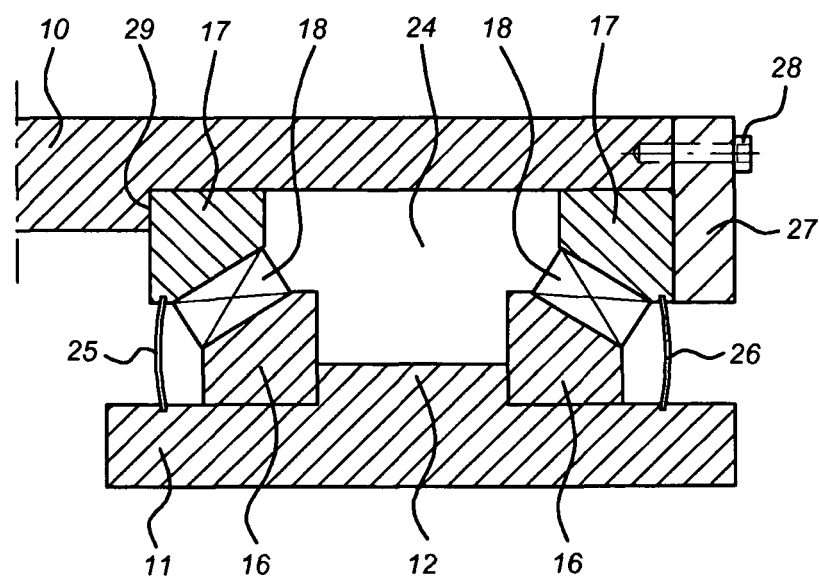
FIG. 3 shows an enlarged cross sectional view of the roller bearings of a further embodiment of the present invention.

As an alternative embodiment a pre-stress ring 27 is provided as a disc like ring in contact with the inner ring 17 of the outer tapered roller bearing 15, as shown in detail in the view of FIG. 3. The hollow shaft 10 is provided with a limiting surface 29, against which the inner ring 17 of the aft tapered roller bearing 14 abuts (the aft tapered roller bearing 14 being the bearing nearest to the tower 8 in operation). The support member 11 with the annular collar 12 abuts the outer ring 16 of the aft tapered roller bearing 14, as well as the outer ring 16 of the front tapered roller bearing 15 (the bearing nearest to the blades 7 in operation). The pre-stress ring 27 is then fastened to the hollow shaft 10, e.g. using a plurality of bolt connections 28, thereby putting strain or pre-stress on the two tapered roller bearings 14, 15. In a further embodiment, the actual pre-stress can be finely tuned, e.g. using shim elements between the outside face of the hollow shaft 10 and the pre-stress ring 27. The shim elements may be machined with a high accuracy allowing a well defined setting of the pre-stress.

Applying a pre-stress to the roller bearings 14, 15 may even result in positive stresses only being exerted on the roller bearings 14, 15 during operation, which enhances the service life of the roller bearings 14, 15. The amount of pre-stress in these embodiments is adapted to ensure a prolonged service life of the roller bearings 14, 15.

As shown in the embodiment of FIG. 3, the wind turbine can furthermore comprise two sealing rings 25, 26. The two sealing rings 25, 26 define a space 24 between the hollow shaft 10 and support member 11, wherein the tapered roller bearings 14, 15 are positioned. The space 24 (or better the tapered roller bearings 14, 15) can then be easily lubricated using this embodiment, as the space 24 is not very big in volume due to the mutual positioning of the roller bearings 14, 15. Simple lubrication means can be used (e.g. a small lubrication pump) to ensure proper lubrication of the roller bearings 14, 15.

The invention is not limited to the exemplary embodiment illustrated in the figures. The skilled person may carry out several modifications which are within the scope of the invention.

The invention claimed is:

1. Wind turbine, comprising a tower (8), a nacelle (3) being connected to the tower (8), and a rotor (2) having a rotor hub (6) and a number of rotor blades (7) extending radially outwards from the rotor hub (6), wherein the nacelle (3) comprises a hollow shaft (10) and the rotor hub (6) comprises a support member (11) which is connected to the hollow shaft (10) by two tapered roller bearings (14, 15) so as to be rotatable about an axis of rotation (5), in which the tapered roller bearings (14, 15) each have a bearing width (w) which is defined in a direction parallel to the axis of rotation (5), and in which the tapered roller bearings (14, 15) are arranged, viewed in said direction parallel to the axis of rotation (5), at a distance (d) from one another which is not greater than the bearing width (w) of the tapered roller bearings (14, 15), an electrical generator having a static part (21) and a rotating part (20), and in which the rotating part (20) of the electrical generator is fixed to the support member (11) of the rotor hub (6), and wherein the rotating part (20) of the electrical generator is situated radially outward with respect to the tapered roller bearings (14, 15), and a pre-stress ring (23; 27) mounted in contact with the tapered roller bearings (14, 15), the pre-stress ring having a shape of a tensioning band and being provided on the outer surface of the support member (11), the pre-stress ring providing a tensioning force on the tapered roller bearings (14, 15).

2. Wind turbine according to claim 1, in which said distance (d) is not greater than half of the bearing width (w) of the tapered roller bearings (14, 15).

3. Wind turbine according to claim 2, in which said distance (d) is not greater than one tenth of the bearing width (w) of the tapered roller bearings (14, 15).

4. Wind turbine according to claim 1, in which said distance (d) is not greater than one tenth of the bearing width (w) of the tapered roller bearings (14, 15).

5. Wind turbine according to claim 1, in which the bearing width (w) of the tapered roller bearings (14, 15) is 185 mm.

6. Wind turbine according to claim 1, in which the tapered roller bearings (14, 15) each have an outer bearing diameter ($r_o$) which is 1.0-2.5 meter.

7. Wind turbine according to claim 1, in which the inner diameter ($s_i$) of the hollow shaft (10) is 0.5-1.8 meter.

8. Wind turbine according to claim 1, in which the support member (11) of the rotor hub (6) is connected to the hollow shaft (10) by said two tapered roller bearings (14, 15) only.

9. Wind turbine according to claim 1, in which each tapered roller bearing (14, 15) comprises an outer ring (16), an inner ring (17) and a roller assembly (18) having conical rollers, and in which the support member (11) of the rotor hub (6) is fixed to the outer ring (16), and in which the hollow shaft (10) is fixed to the inner ring (17).

10. Wind turbine according to claim 9, in which at least part of the outer ring (16) and/or the inner ring (17) of each tapered roller bearing (14, 15) is hardened.

11. Wind turbine according to claim 1, in which a spacer (12) is arranged between the tapered roller bearings (14, 15).

12. Wind turbine according to claim 1, further comprising two sealing rings (25, 26) which seal off a bearing space (24) between the hollow shaft (10) and support member (11).

13. A wind turbine, comprising:
a tower (8);
a nacelle (3) connected to the tower (8), the nacelle (3) comprising a hollow shaft (10);
a rotor (2) having a rotor hub (6) and plural rotor blades (7) extending radially outwards from the rotor hub (6), the rotor hub (6) comprising a support member (11), the support member (11) being rotatable, about an axis of rotation (5), around the hollow shaft (10) via two tapered roller bearings (14, 15) located between the hollow shaft (10) and the support member (11),
wherein the tapered roller bearings (14, 15) each have a bearing width (w) which is defined in a direction parallel to the axis of rotation (5), and
wherein the tapered roller bearings (14, 15) are arranged, viewed in said direction parallel to the axis of rotation (5), at a distance (d) from one another which is not greater than the bearing width (w) of the tapered roller bearings (14, 15);
an electrical generator having i) a rotating part (20) fixed to the support member (11) of the rotor hub (6) and situated radially outward with respect to the tapered roller bearings (14, 15), and ii) a static part (21) located radially outward of the rotating part (20); and
a pre-stress ring (23) mounted on an outer surface of the support member (11) and in mechanical contact with the tapered roller bearings (14, 15), the pre-stress ring (23) having a shape of a tensioning band and providing a tensioning force on the tapered roller bearings (14, 15) via the support member (11).

14. A wind turbine, comprising:
a tower (8);
a nacelle (3) connected to the tower (8), the nacelle (3) comprising a hollow shaft (10) with a limiting surface (29);
a rotor (2) having a rotor hub (6) and plural rotor blades (7) extending radially outwards from the rotor hub (6), the rotor hub (6) comprising a support member (11) with an annular collar (12), the support member (11) being rotatable, about an axis of rotation (5), around the hollow shaft (10) via two tapered roller bearings (14, 15) located between the hollow shaft (10) and the support member (11),
wherein each tapered roller bearing (14, 15) comprises an outer ring (16), an inner ring (17), and a roller assembly (18) having conical rollers, the outer ring (16) of each tapered roller bearing being fixed to the support member (11) of the rotor hub (6), wherein the inner ring (17) of an aft one of the tapered roller bearing (14) abuts the limiting surface (29) of the hollow shaft (10), wherein the annular collar (12) abuts the outer rings (16) of the tapered roller bearings, wherein the tapered roller bearings (14, 15) each have a bearing width (w) which is defined in a direction parallel to the axis of rotation (5), and wherein the tapered roller bearings (14, 15) are arranged, viewed in said direction parallel to the axis of rotation (5), at a distance (d) from one another which is not greater than the bearing width (w) of the tapered roller bearings (14, 15);

an electrical generator having i) a rotating part (20) fixed to the support member (11) of the rotor hub (6) and situated radially outward with respect to the tapered roller bearings (14, 15), and ii) a static part (21) located radially outward of the rotating part (20); and a pre-stress ring (27) fastened to an end of the hollow shaft (10) and in contact with the inner ring (17) of an outer one of the tapered roller bearings (15), the pre-stress ring (27) being disc shaped and providing a tensioning force on the tapered roller bearings (14, 15) via the contact with the inner ring (17) of the outer one of the tapered roller bearings (15).

\* \* \* \* \*